United States Patent
Lin et al.

(10) Patent No.: US 10,884,469 B2
(45) Date of Patent: Jan. 5, 2021

(54) METHOD AND SYSTEM FOR DYNAMICALLY ALLOCATING AND OPTIMIZING POWER RESOURCES

(71) Applicant: QUANTA COMPUTER INC., Taoyuan (TW)

(72) Inventors: Hung-Sheng Lin, Taoyuan (TW); Wen-Kai Lee, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 130 days.

(21) Appl. No.: 16/131,883

(22) Filed: Sep. 14, 2018

(65) Prior Publication Data
US 2020/0089298 A1    Mar. 19, 2020

(51) Int. Cl.
   G06F 1/28      (2006.01)
   G06F 9/50      (2006.01)
   G06F 11/30     (2006.01)

(52) U.S. Cl.
   CPC ............... *G06F 1/28* (2013.01); *G06F 9/5094* (2013.01); *G06F 11/3006* (2013.01); *G06F 11/3058* (2013.01)

(58) Field of Classification Search
   CPC ...... G06F 1/28; G06F 9/5094; G06F 11/3006; G06F 11/3058
   USPC ........................................................ 713/340
   See application file for complete search history.

(56) References Cited

U.S. PATENT DOCUMENTS

| | | | | |
|---|---|---|---|---|
| 5,532,945 A * | 7/1996 | Robinson | ............. | G06F 1/3215 365/226 |
| 6,498,460 B1 * | 12/2002 | Atkinson | ............... | G06F 1/263 320/135 |
| 7,210,048 B2 * | 4/2007 | Bodas | .................... | G06F 1/206 713/320 |
| 7,509,505 B2 * | 3/2009 | Randall | ................ | G06F 1/3203 713/300 |
| 7,539,881 B2 * | 5/2009 | Shaw | .................... | G06F 1/3203 713/300 |
| 7,702,931 B2 * | 4/2010 | Goodrum | ............. | G06F 1/3203 700/295 |

(Continued)

FOREIGN PATENT DOCUMENTS

| | | |
|---|---|---|
| JP | 2007213167 A | 8/2007 |
| JP | 2013041473 A | 2/2013 |

(Continued)

OTHER PUBLICATIONS

Extended European Search Report for EP Application No. 19151286.2, dated Jul. 1, 2019.

(Continued)

*Primary Examiner* — Paul R. Myers
(74) *Attorney, Agent, or Firm* — Nixon Peabody LLP

(57) ABSTRACT

A method and system for dynamically allocating power resources. The system includes a central controller connected to automatic transfer switches. The system also includes power zones. Each of the power zones includes server devices. Each of the automatic transfer switches are connected to at least one of the power zones. The system also includes a power pool connected to a power source. The power pool is connected to the central controller configured to dynamically allocate power of the power pool to the power zones.

15 Claims, 9 Drawing Sheets

(56) References Cited

U.S. PATENT DOCUMENTS

| | | | | |
|---|---|---|---|---|
| 7,861,102 | B1* | 12/2010 | Ranganathan | G06F 1/3206 713/300 |
| 7,984,311 | B2* | 7/2011 | Brumley | G06F 1/3209 700/295 |
| 8,006,108 | B2* | 8/2011 | Brey | G06F 1/3203 713/320 |
| 8,595,515 | B1* | 11/2013 | Weber | G06F 30/13 713/300 |
| 8,843,772 | B2 | 9/2014 | Hormuth | |
| 9,081,568 | B1* | 7/2015 | Ross | G06F 1/263 |
| 9,164,557 | B1* | 10/2015 | Marr | G06F 1/28 |
| 9,207,744 | B2* | 12/2015 | Li | G06F 1/3206 |
| 9,250,684 | B1* | 2/2016 | Chen | G06F 1/3206 |
| 9,414,531 | B1* | 8/2016 | Towner | H05K 7/20709 |
| 9,537,291 | B1* | 1/2017 | Wilding | G06F 1/26 |
| 9,720,476 | B1* | 8/2017 | Nguyen | G06F 1/263 |
| 9,973,006 | B1* | 5/2018 | Nguyen | H02J 3/0073 |
| 10,345,888 | B2* | 7/2019 | Allen-Ware | G06Q 50/06 |
| 10,432,017 | B1* | 10/2019 | Morales | H02J 7/007 |
| 10,491,036 | B1* | 11/2019 | Mische | H02J 9/061 |
| 2002/0157929 | A1* | 10/2002 | Schultz | H01H 1/205 200/1 R |
| 2006/0259796 | A1 | 11/2006 | Fung | |
| 2007/0260896 | A1* | 11/2007 | Brundridge | G06F 1/3203 713/300 |
| 2008/0222435 | A1* | 9/2008 | Bolan | G06F 1/3203 713/310 |
| 2009/0077407 | A1* | 3/2009 | Akimoto | G06F 1/26 713/340 |
| 2009/0119523 | A1 | 5/2009 | Totten | |
| 2009/0254769 | A1* | 10/2009 | Brundridge | G06F 1/3203 713/320 |
| 2010/0141038 | A1* | 6/2010 | Chapel | H01R 25/003 307/64 |
| 2011/0144818 | A1* | 6/2011 | Li | G06F 1/3203 700/291 |
| 2012/0072765 | A1* | 3/2012 | Bower, III | G06F 11/1666 714/3 |
| 2012/0181869 | A1* | 7/2012 | Chapel | H02J 9/06 307/64 |
| 2013/0226362 | A1* | 8/2013 | Jagadishprasad | G06F 9/5094 700/297 |
| 2013/0268779 | A1 | 10/2013 | Hueston et al. | |
| 2014/0281645 | A1* | 9/2014 | Sen | H02J 3/32 713/340 |
| 2015/0084420 | A1* | 3/2015 | Dickerson | H02J 9/06 307/29 |
| 2015/0181869 | A1* | 7/2015 | DeKorver | A01N 53/00 546/281.7 |
| 2016/0021793 | A1* | 1/2016 | Chen | H05K 7/1497 361/679.47 |
| 2018/0027063 | A1* | 1/2018 | Nachimuthu | G02B 6/4292 709/226 |

FOREIGN PATENT DOCUMENTS

| | | |
|---|---|---|
| JP | 2013206077 A | 10/2013 |
| JP | 6174837 B1 | 8/2017 |
| JP | 2018116680 A | 7/2018 |
| TW | I360741 B | 3/2012 |
| TW | I521338 B | 2/2016 |
| TW | I566081 B | 1/2017 |
| WO | 2017103185 A1 | 6/2017 |

OTHER PUBLICATIONS

TW Office Action for Application No. 107145380, dated Dec. 26, 2019, w/ First Office Action Summary.
TW Search Report for Application No. 107145380, dated Dec. 26, 2019, w/ First Office Action.
JP Office Action for Application No. 2019-053092, dated Mar. 31, 2020, w/ First Office Action Summary.
JP Office Action for Application No. 2019-053092, dated Sep. 29, 2020, w/ Second Office Action Summary.

* cited by examiner

METHOD AND SYSTEM FOR DYNAMICALLY ALLOCATING AND OPTIMIZING POWER RESOURCES

FIELD OF THE INVENTION

This application relates to information handling systems, and more particularly to power allocation in an information handling system environment.

BACKGROUND

As the value and use of information continues to increase, individuals and businesses seek additional ways to process and store information. One option available to individuals and businesses is information handling systems. An information handling system generally processes, compiles, stores, and communicates information, thereby allowing users to take advantage of the value of such information. However, because technology and information handling needs and requirements vary between different users or applications, these systems may also vary significantly. In particular, the system may vary with regards to what information is handled, how the information is handled, how much information is processed, stored, or communicated, and how efficiently the information may be processed, stored, or communicated. As a result, some systems may be generally configured for any type of information handling. In contrast, other systems may be specifically configured for financial transaction processing, airline reservations, enterprise data storage, or global communications. In addition, information handling systems may include a variety of hardware and software components, either generic or specialized, that may be configured to process, store, and communicate information and may include one or more computer systems, data storage systems, and networking systems.

Multiple information handling systems, such as servers, can be grouped together for data center implementations. However, power in the data center remains a major concern for information technology (IT) management. In particular, performance per watt is a critical aspect to driving higher efficiency. Therefore, power usage in a data center is typically monitored closely to ensure efficient energy use.

One traditional approach to ensure efficient energy use is power capping. Power capping involves capping an amount of power that servers within a group of multiple servers in a rack can draw from a power supply. That is, each server within the group of servers in the server rack is assigned a maximum power usage level that it cannot exceed, such that the total power consumption of all servers, when operating at their maximum power levels, does not exceed the total power capacity for a given efficiency. Conventional power capping is implemented in an attempt to deliver power with a smaller number of efficiently operating power supplies, as opposed to increasing the number of power supplies, thereby enabling greater density or number of servers. To implement power capping, a baseboard management controller (BMC) of each server in the server rack monitors real time power consumption of the given server. The BMC is also able to issue commands to the information handling unit of the given server to limit CPU, memory, storage, networking power consumption below the assigned power cap for the given server. These commands include adjusting the operating conditions of the information handling unit of the given server.

However, power capping is but one traditional approach to ensure efficient energy use. Other conventional approaches include adding a super capacitor, or implementing a soft start for components within the server or the server itself.

Unfortunately, these conventional methods are not dynamic and do not address the issues of a specific server in real time. For example, FIG. 1 shows the power consumption of a server during a power up phase. As illustrated in FIG. 1, a server can require additional power for a very brief time above the full capacity of the power supply source when powering-up. During this brief time, the server can require as much as 150-200% of the power supply source. This additional resource is typically provided from another power source, thereby causing depreciation in power and subsequently, the performance of other servers within a group of servers in a rack. Consequently, the extra required power will drive costs up and depreciate the performance of other servers. Therefore, there exists a need for a power distribution system that dynamically allocates power resources according to a server's demands.

SUMMARY

The following is a simplified summary of one or more embodiments in order to provide a basic understanding of present technology. This summary is not an extensive overview of all contemplated embodiments of the present technology. It is intended neither to identify key or critical elements of all examples, nor to delineate the scope of any or all aspects of the present technology. Its sole purpose is to present some concepts of one or more examples in a simplified form as a prelude to the more detailed description that is presented later.

A method and system for dynamically allocating power resources is provided herein. The system includes a central controller connected to automatic transfer switches. The system also includes power zones. Each of the power zones includes server devices. Each of the automatic transfer switches are connected to at least one of the power zones. The system also includes a power pool connected to a power source. The power pool is connected to the central controller configured to dynamically allocate power of the power pool to the power zones.

In some embodiments, the server device includes at least one of a storage chassis, a GPU chassis, a storage chassis and an accelerator chassis. In some embodiments, the central controller is connected to the plurality of server devices via a management bar to retrieve a power usage measurement of each of the server devices within the plurality of server devices. In some embodiments, the power pool is connected to the plurality of automatic transfer switches, such that the central controller directs power to the each of the plurality of power zones. In some embodiments, the system can include power bars configured to connect the power pool to the each of the plurality of power zones via the plurality of automatic transfer switches.

The method can include retrieving a power usage measurement from a server device. The server device can be located within either a first or second set of server devices. The method also includes determining whether the server device includes a power gap or unused power supply. The method also includes determining a power distribution strategy based on determining whether the server device includes the power gap or the unused power supply. The method also includes directing power to the server device within the first or second set of server devices based on the determined power distribution strategy.

In some embodiments, the method also includes periodically monitoring power usage of the server device. In some embodiments, the power usage measurement of the server device is retrieved by a Pooled System Management Engine (PSME) unit. In some embodiments, the server device includes a power gap or unused power supply where the server device is initially installed within a chassis device. In alternative embodiments, the server device includes a power gap or unused power supply where a redundancy mode is implemented for a current distribution of power. In some embodiments, the redundancy mode can result in excess power distribution and provides unused power supply.

Additional features and advantages of the disclosure will be set forth in the description that follows, and in part, will be obvious from the description; or can be learned by practice of the principles disclosed herein. The features and advantages of the disclosure can be realized and obtained by means of the instruments and combinations particularly pointed out in the appended claims.

BRIEF DESCRIPTION OF THE DRAWINGS

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings.

DETAILED DESCRIPTION

Figure 1:
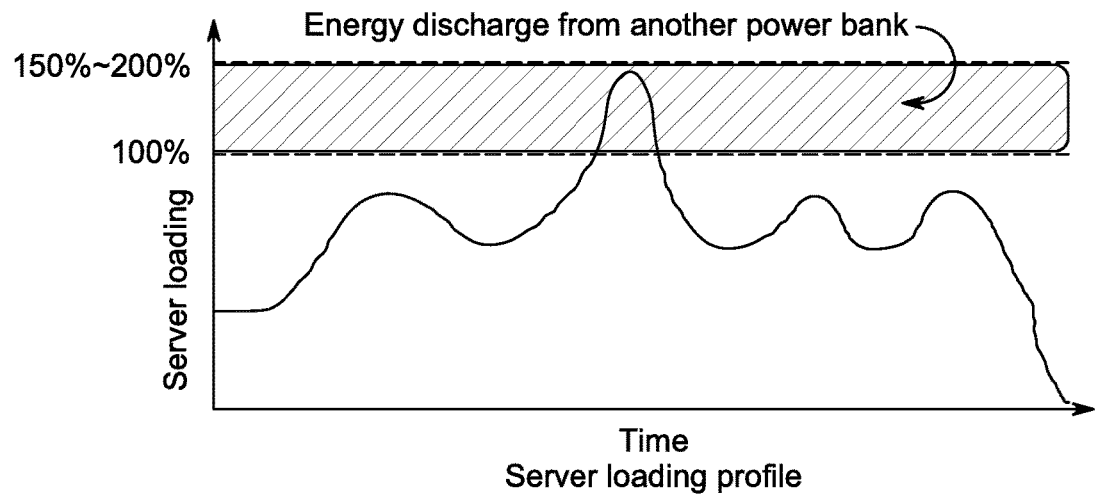
FIG. 1 is a graphical illustration of power consumption of a server device in a traditional system.

The present invention is described with reference to the attached figures, where like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Figure 2:
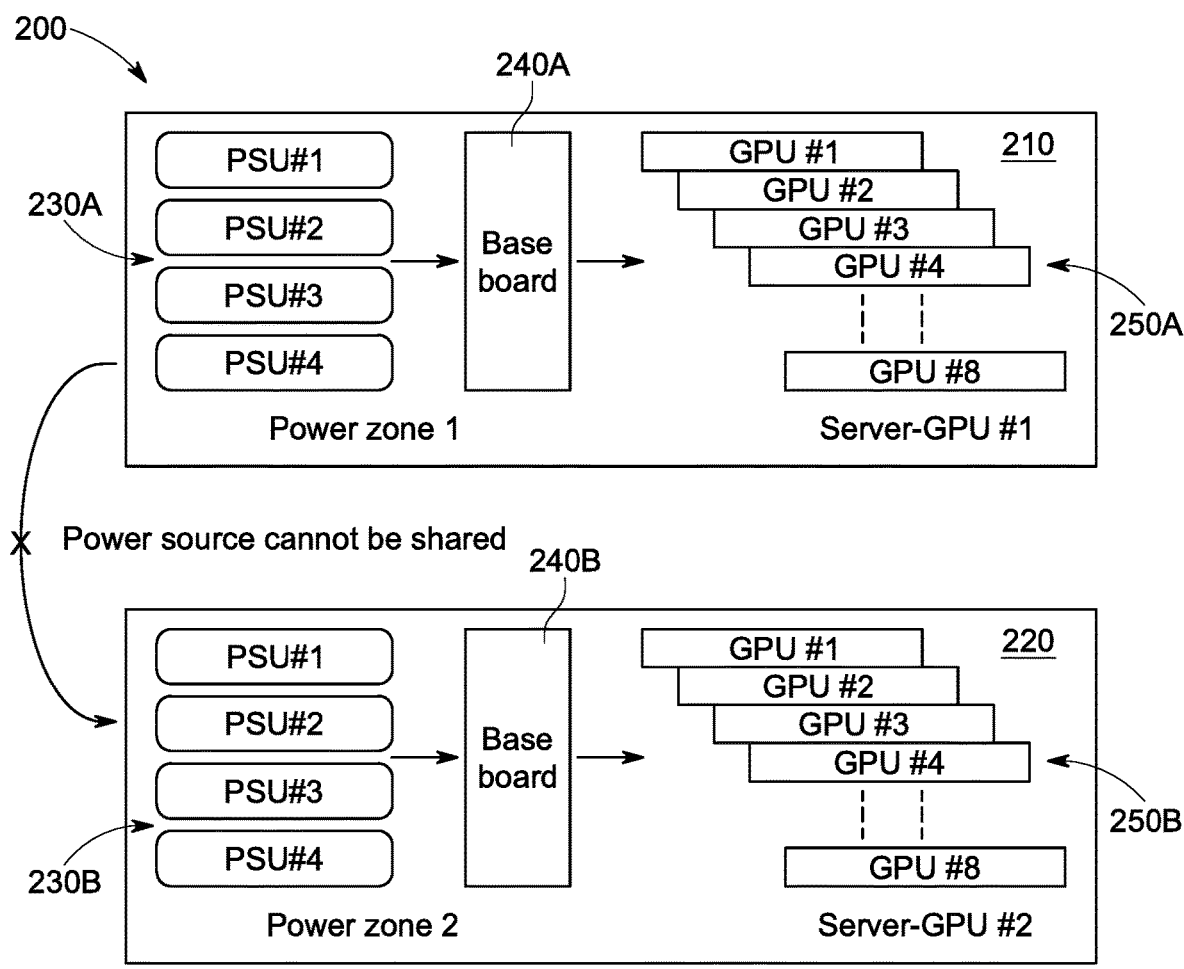
FIG. 2 illustrates a traditional power source architecture.

As discussed above, conventional methods of for ensuring efficiency energy usage (such as power capping, adding a super capacitor, or implementing a soft start for components within the server or the server itself) are not dynamic and do not address the issues of a specific server in real time. FIG. 2 illustrates a traditional power source architecture 200. The power source architecture 200 can be implemented in a rack server (not shown) or across multiple rack servers in a data center (also not shown). The power source architecture 200 includes a first power zone 210 and a second power zone 220. The first power zone 210 can include a first plurality of power supply units 230A, a first base board 240A, and a first plurality of server devices 250A. Similarly, the second power zone 220 can include a second plurality of power supply units 230B, a second base board 240B, and a second plurality of server devices 250B. Each of the power zones are standalone systems. In other words, the plurality of power supply units 230 of the first power zone 210 cannot be implemented in conjunction with the plurality of power supply units 230 of the second power zone 220. As a result, the power supply units of the first and second power zones are not optimized for the performance of the server devices 250A and 250B of the power source architecture 200.

The present application provides an exemplary method and system for dynamically allocating power resources. The system includes a central controller connected to automatic transfer switches. The system also includes power zones. Each of the power zones includes server devices. Each of the automatic transfer switches are connected to at least one of the power zones. The system also includes a power pool connected to a power source. The power pool is connected to the central controller configured to dynamically allocate power of the power pool to the power zones. This process is discussed in more detail below with respect to FIGS. 3-8.

Figure 3:
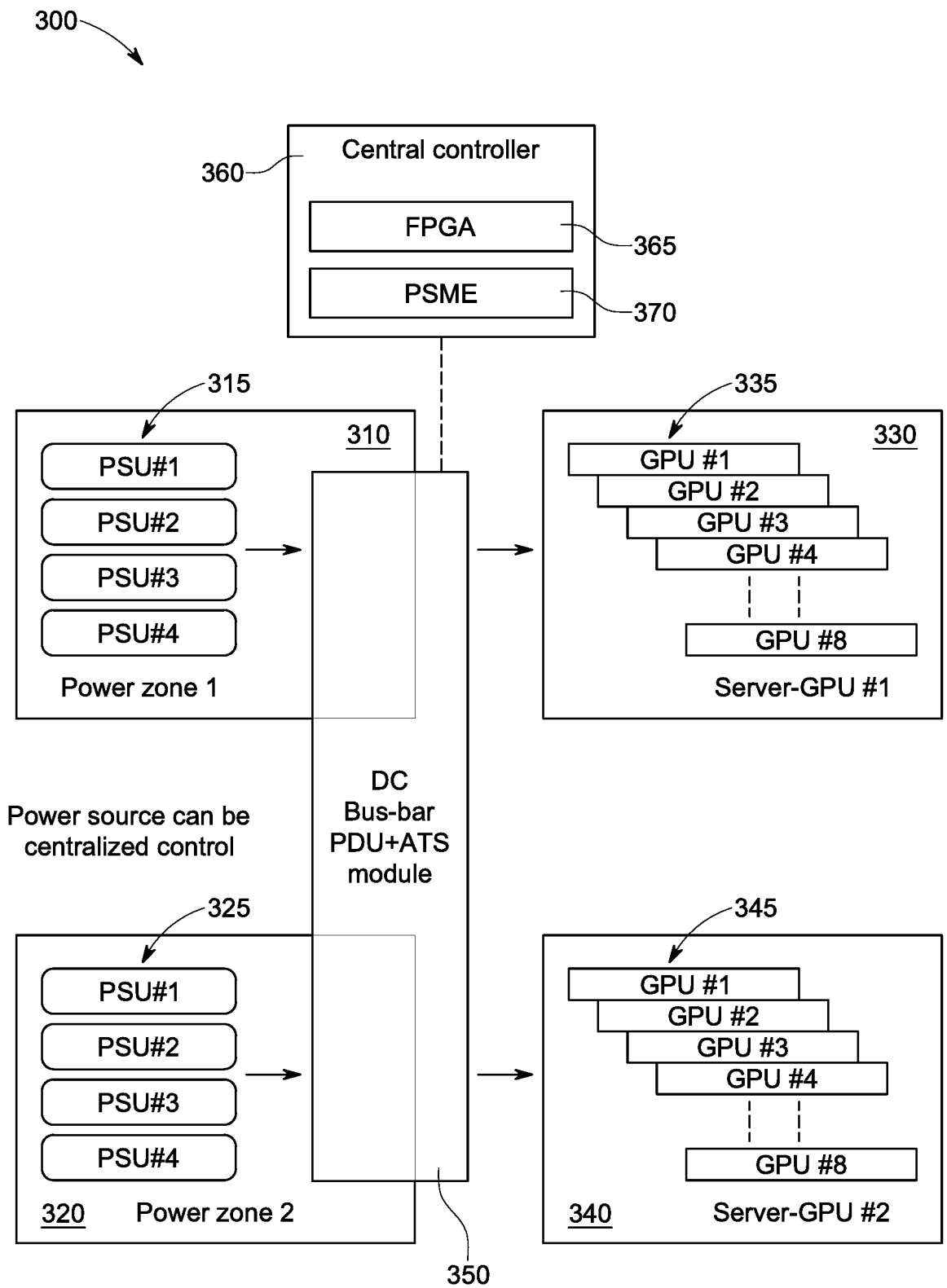
FIG. 3 illustrates a power source architecture for dynamically allocating power resources according to a server device's demands in real time, in accordance with an implementation of the present disclosure.

FIG. 3 illustrates a power source architecture 300 configured to dynamically allocate power resources according to a server device's demands in real time. The power source architecture 300 includes a first power zone 310, a second power zone 320, a first set of server devices 330, and a second set of server devices 340. The first power zone 310 can include a first plurality of power supply units 315.

Figure 4:
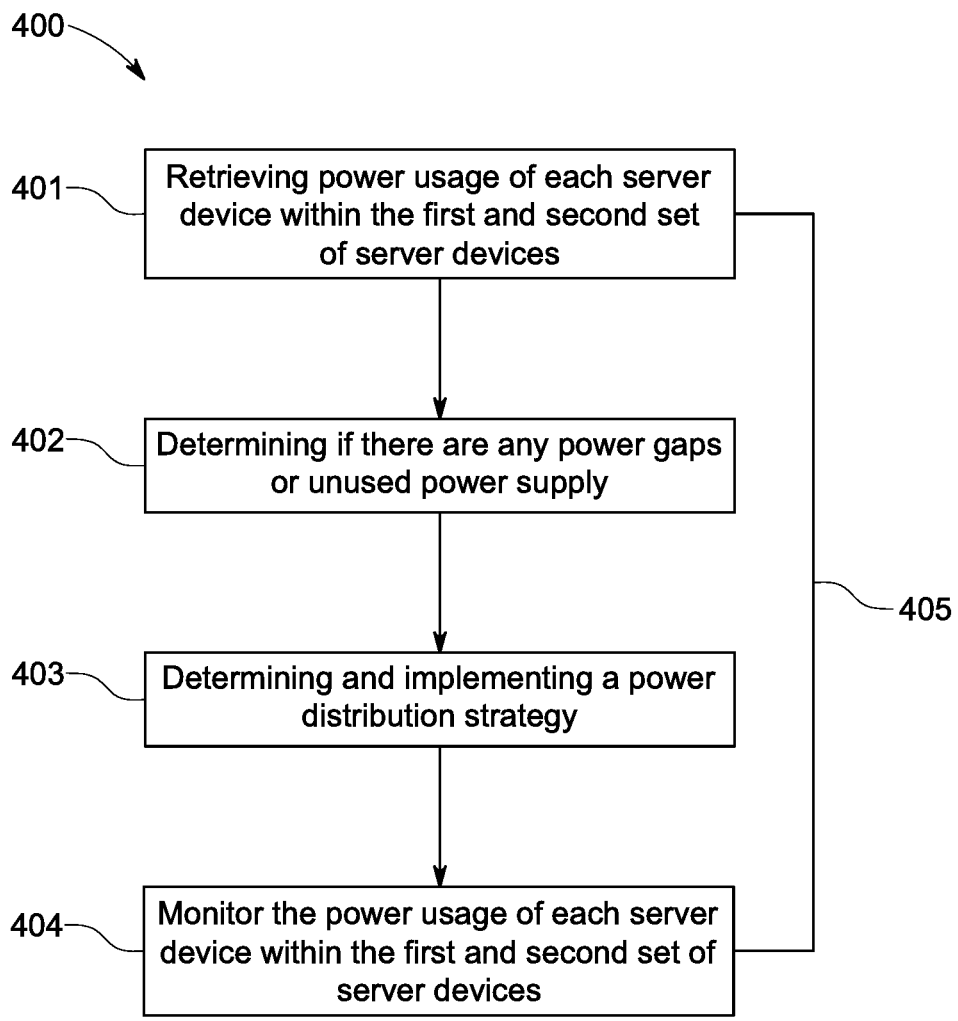
FIG. 4 depicts a flow chart describing a process 400 for dynamically allocating power resources according to a server device's demands, in accordance with an implementation of the present disclosure.

Similarly, the second power zone 320 can include a second plurality of power supply units 325. The first set of server devices 330 can include a first plurality of graphics processing units (GPUs) 335. Similarly, the second set of server devices 330 can include a second plurality of graphics processing units (GPUs) 345. It should be noted that although GPUs are referenced in this disclosure, any server components can be implemented herein. This includes, for example, central processing units (CPUs), compute servers, storage servers, etc. The first power zone 310 and the second power zone 320 are connected to the first set of server devices 330 and the second set of server devices 340 by a power pool module 350. The power pool module 350 can include a direct current bus bar power distribution unit (PDU) coupled to an automatic transfer switch (ATS). The power source architecture 300 can be implemented in a single rack server (not shown) or across multiple rack servers within a data center (also not shown). The power source architecture 300 can also include a central controller 360. The central controller 360 can be located on a rack server device. Alternatively, the central controller 360 can be located in a centralized area in a data center servicing multiple rack server devices. The central controller 360 can be implemented to control how the power pool module 350 distributes power from the first power zone 310 and the second power zone 320. To distribute power from the first power zone 310 and the second power zone 320, the central controller 360 can implement the ATS of the power pool module 350 to distribute power to a specific server component within the first set of server devices 330 or the second set of server devices 340 based on real time requirements. Furthermore, the central controller 360 can also include a Field Programmable Gate Array (FPGA) unit 365. The FPGA unit 365 is configured to perform local machine learning to enable the central controller 360 to automatically distribute power in real time based on historical needs of the server components. The central controller 360 can also include a Pooled System Management Engine (PSME) unit 370. The PSME 370 can be configured to retrieve performance metrics of the server devices within the first set of server devices 330 or the second set of server devices 340. This is discussed in further detail with respect to FIG. 4. FIG. 4 depicts a flow chart describing the process 400 for dynamically allocating power resources according to a server device's demands. The following description of the process 400 is described in detail with reference to the components of the power source architecture 300 of FIG. 3. The process 400 begins at step 401, where the power usage is retrieved for each server devices within the first set of server devices 330 or the second set of server devices 340. The power usage of each server device can be retrieved by the PSME 370. Specifically, the PSME 370 can retrieve the percentage of power each server device uses.

At step 402, the central controller 360 can determine if there are any power gaps or unused power supply that is currently designated to a specific server device that can be released and reallocated. For example, a server device can be removed from either the first set of server devices 330 or the second set of server devices 340. Or in some embodiments, a new server device can be installed within either the first set of server devices 330 or the second set of server devices 340. In other examples of unused power supply or power gaps, a redundancy mode may be implemented for the current distribution of power from the first power zone 310 and the second power zone 320. The redundancy mode can result in excess power distribution and may therefore provide unused power supply. Furthermore, the FPGA unit 365 can determine if there is foreseeable power gaps or unused power supply of a server device based on predictive analysis.

At step 403, a power distribution strategy can be determined and implemented by the central controller 360. Upon determining a power strategy, the central controller 360 can direct the ATS within the power pool module 350 to redirect the unused power. Specifically, the central controller 360 can direct the ATS to switch a power supply unit within the first or second plurality of power supply units 315, 325 to another server device.

At step 404, where the power usage of each of the server devices within the first set of server devices 330 or the second set of server devices 340 is monitored. The process 400 is then repeated periodically at 405 to ensure maximum performance of the power source architecture 300. It should be understood by one of ordinary skill in the art that the power source architecture 300 of FIG. 3, and the accompanying process 400 of FIG. 4 can include more or less power zones than indicated herein.

Figure 5:
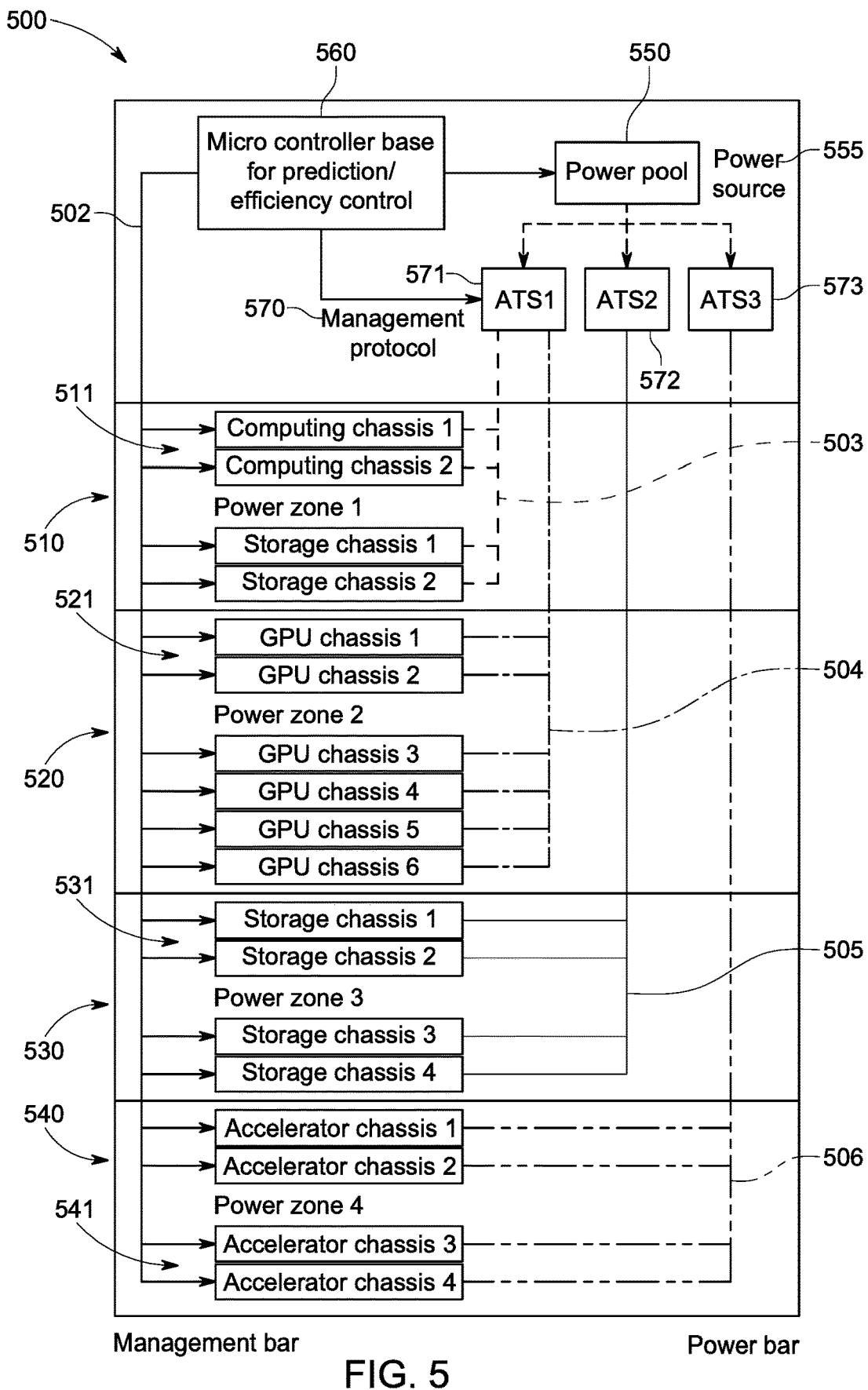
FIG. 5 depicts an information handling system 500 configured to dynamically allocate power resources according to a server device's demands in real time, in accordance with an implementation of the disclosure.

FIG. 5 depicts an information handling system 500 configured to dynamically allocate power resources according to a server device's demands in real time. In some embodiments, the information handling system 500 can be configured as a rack device. The rack device can be a single rack device among thousands of rack devices in a data center. The information handling system 500 includes a first power zone 510, a second power zone 520, a third power zone 530, and a fourth power zone 540. It should be understood by one of ordinary skill in the art that the information handling system 500 can include more or less power zones than indicated herein. The information handling system 500 can be customized for specific performance requirements of a specific customer. As a result, the power zones shown herein are for exemplary purposes and are not intended to be exhaustive.

The first power zone 510 can include a first set of chasses 511. The first set of chasses 511 can include various combinations of computing chasses and storage chasses. For exemplary purposes, FIG. 5 illustrates two computing chasses and two storage chasses within the first set of chasses 511. However, it should be understood by one of ordinary skill in the art that the first set of chasses 511 can include more or less computing chasses or storage chasses than indicated herein. The second power zone 520 can include a second set of chasses 521. The second set of chasses 521 can include GPU chasses. For exemplary purposes, FIG. 5 illustrates six GPU chasses within the second set of chasses 521. However, it should be understood by one of ordinary skill in the art that the second set of chasses 521 can include more or less GPU chasses than indicated herein.

The third power zone 530 can include a third set of chasses 531. The third set of chasses 531 can include storage chasses. For exemplary purposes, FIG. 5 illustrates four storage chasses within the third set of chasses 531. However, it should be understood by one of ordinary skill in the art that the third set of chasses 531 can include more or less storage chasses than indicated herein. The fourth power zone 540 can include a fourth set of chasses 541. The fourth set of chasses 541 can include accelerator chasses. For exemplary purposes, FIG. 5 illustrates four accelerator chasses within the fourth set of chasses 541. However, it should be understood by one of ordinary skill in the art that the fourth set of chasses 541 can include more or less accelerator chasses than indicated herein. It should also be understood by one of ordinary skill in the art that power zones may also include a mix of chassis types.

The information handling system 500 can also include a central controller 560 and a power pool 550. The power pool 550 can be connected to a power source 555. In some embodiments, the information handling system 500 can include multiple power sources providing resources to the power pool 550. In some embodiments, power supply units that make up the power source 555 can be located in each of the power zones as well. The central controller 560 can be implemented to control power distribution from the power pool 550 to the first, second, third and fourth power zones 510-540. The information handling system 500 can also include a ATS1 device 571, a ATS2 device 572 and a ATS3 device 573. The first, second and third ATS devices 571-573 can be controlled by the central controller 560. To distribute power to the first, second, third and fourth power zones 510-540 the central controller 560 can implement the ATS devices 571-573 to distribute power to a specific set of chasses. The central controller 560 can implement the ATS devices 571-573 by using a management protocol 570. In some embodiments, the management protocol 570 can be installed on the central controller 560. In alternative embodiments, the management protocol 570 can be installed remote to the central controller 560 on a separate computing device or a standalone device.

The information handling system 500 can also include a management bar 502, a first power bar 503, a second power bar 504, a third power bar 505, and a fourth power bar 506. The first power bar 503 can be configured to connect the power pool 550 to the first set of chasses 511 via the ATS1 device 571. Similarly, the second power bar 504 can be configured to connect the power pool 550 to the second set of chasses 521 via the ATS1 device 571. The third power bar 505 can be configured to connect the power pool 550 to the third set of chasses 531 via the ATS2 device 572. Finally, the fourth power bar 506 can be configured to connect the power pool 550 to the fourth set of chasses 541 via the ATS3 device 573.

The management bar 502 can connect the central controller 560 to each chassis within the first, second, third and fourth set of chasses 511, 521, 531 and 541. In this way, the central controller 560 can receive performance behaviors and perform assessments of each chassis in real time. As explained earlier with respect to FIG. 3, the central controller 560 can include a FPGA unit configured to perform local machine learning. The local machine learning feature enables the central controller 560 to automatically distribute power in real time based on historical needs of the chasses. In some embodiments, the central controller 560 can include a solid-state drive (SSD) configured to store metadata/daily log. The SSD can be used as the data source for the FPGA to perform the machine learning and pre-allocate the power source.

The central controller 560 can also include a PSME unit (as previously discussed with respect to FIG. 3) to retrieve performance metrics of the chasses within the first, second, third, and fourth power zones 510, 520, 530 and 540.

Figure 6A:
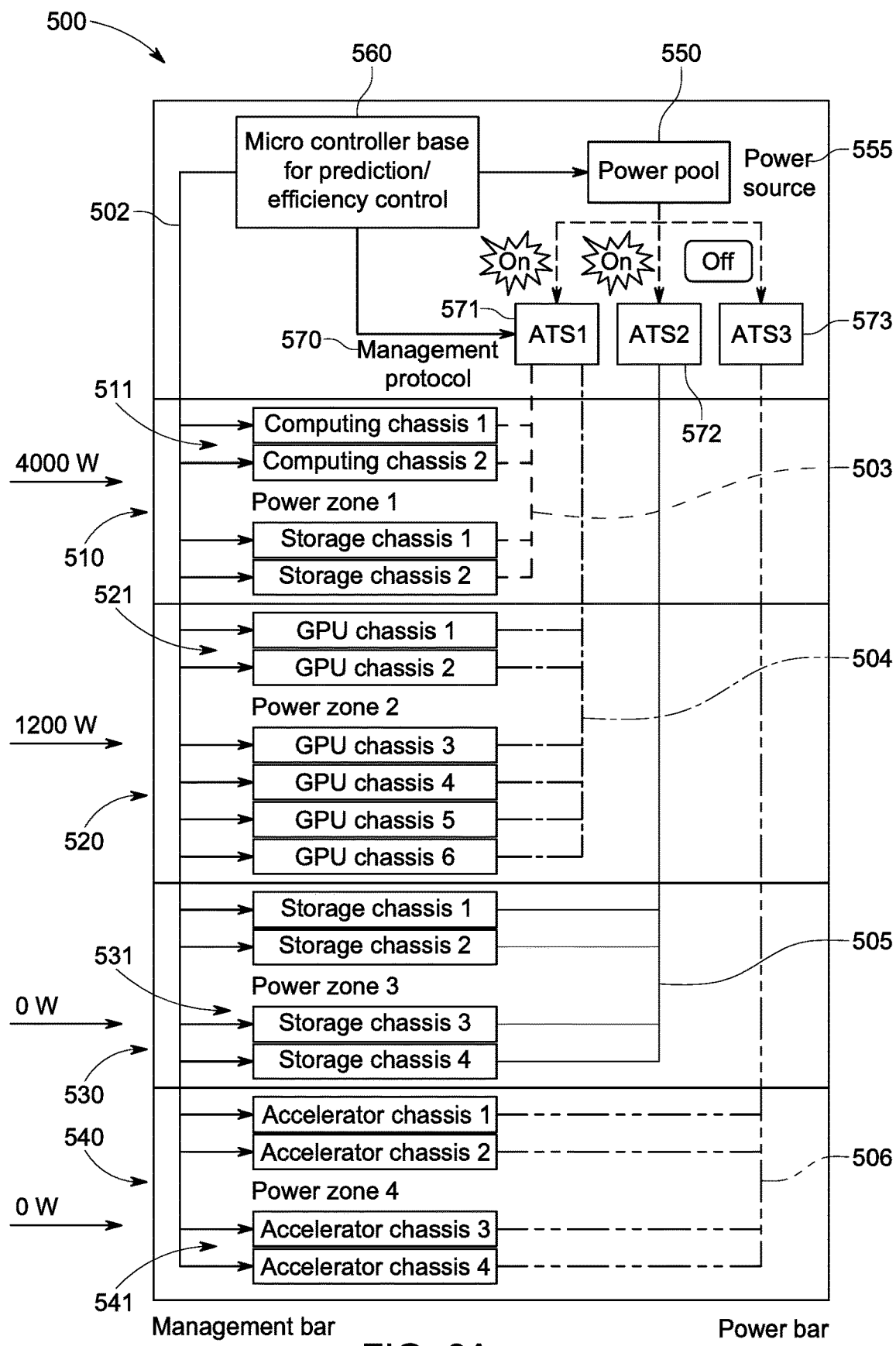
FIG. 6A exemplifies a first embodiment of the information handling system 500 configured to dynamically allocate power resources according to a server device's demands in real time.
Figure 6B:
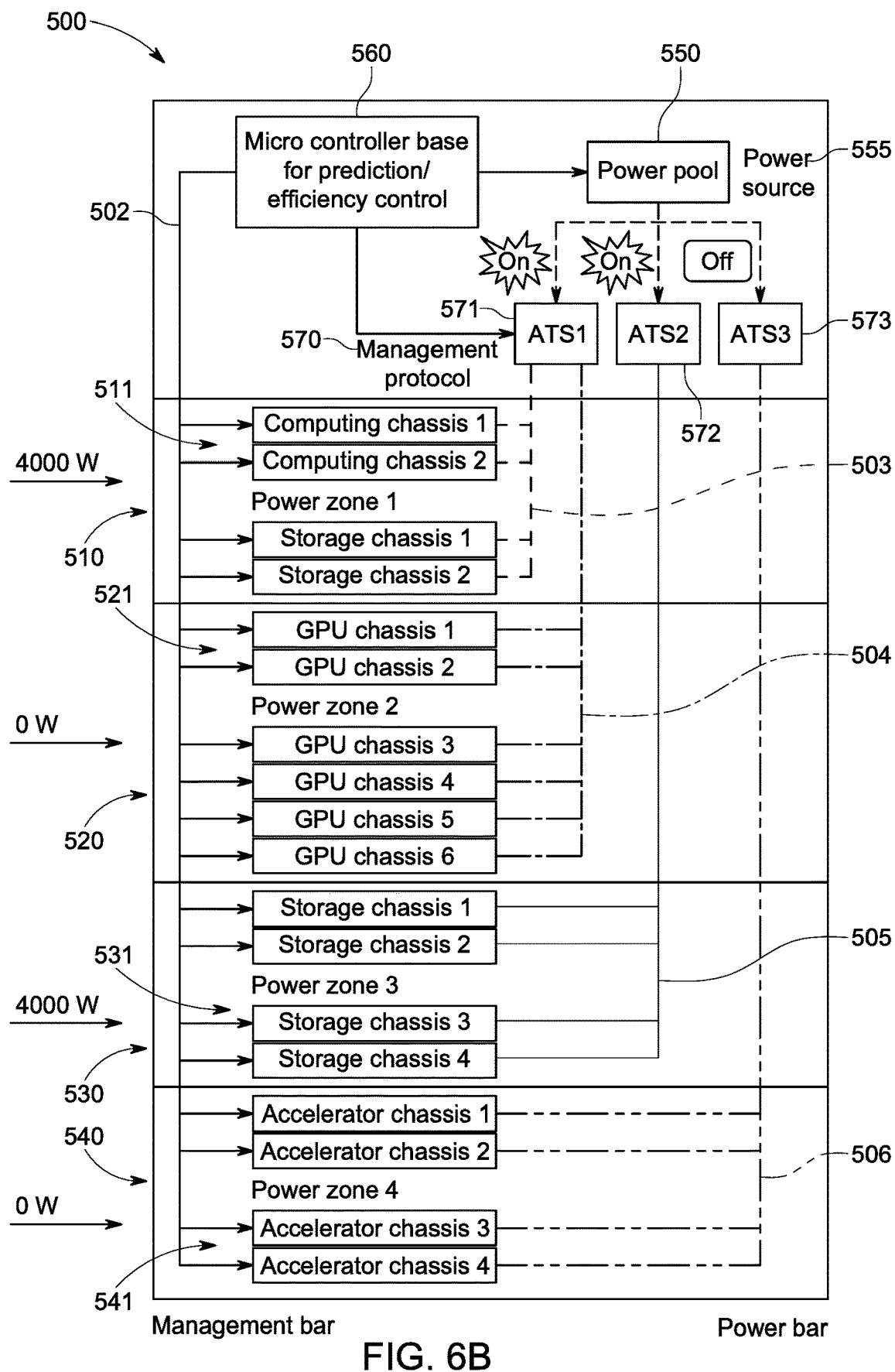
FIG. 6B exemplifies a second embodiment of the information handling system 500 configured to dynamically allocate power resources according to a server device's demands in real time.
Figure 6C:
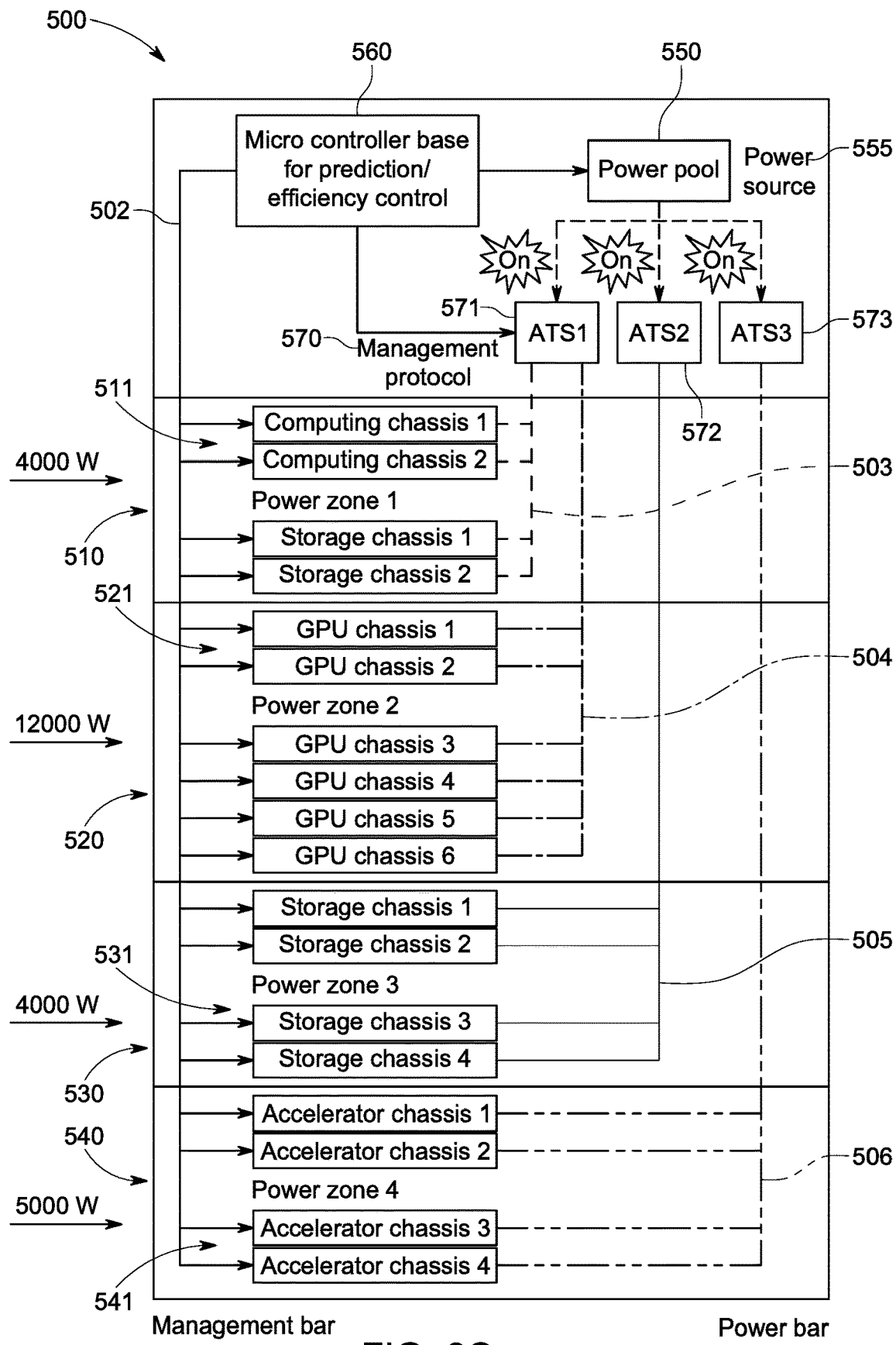
FIG. 6C exemplifies a third embodiment of the information handling system 500 configured to dynamically allocate power resources according to a server device's demands in real time.

It should be understood that the central controller 560 can activate a specific ATS device to address system needs. FIGS. 6A-6C illustrate the various configurations of the information handling system 500.

FIG. 6A exemplifies a first embodiment of the information handling system 500 configured to dynamically allocate power resources according to a server device's demands in real time. The ATS1 device 571 and the ATS2 device 572 are activated, while the ATS3 device 573 is inactive. As a result, the first and second power zones 510 and 520 receive power from the power pool 550 via the ATS1 device 571. The first power zone 510 is receiving 4000 Watts from the power pool 550 via the ATS1 device 571. The second power zone 520 is receiving 1200 Watts from the power pool 550 via the ATS1 device 571.

In some embodiments, although an ATS device is active the associated power zone may not receive power. For example, the ATS2 device 572 is activated, however the third power zone 530 is receiving no power. As indicated above, the central controller 560 can direct or redirect power from the power pool 550 to the power zones based on real time needs. Therefore, the ATS2 device 572 might be active while the third set of chasses 531 receives no power. The ATS2 device 572 can subsequently be inactivated. The ATS3 device 573 is inactive. As a result, the fourth set of chasses 541 within the fourth power zone 540 is not receiving any power. In some embodiments, the ATS2 can be powered on during the power consumption because the central controller 560 can predict the workload will be started at a specified moment in accordance with data collected by the central controller 560. As a result, the central controller 560 can predict the next upcoming workload and prepare for it in advance.

FIG. 6B exemplifies a second embodiment of the information handling system 500 configured to dynamically allocate power resources according to a server device's demands in real time. The ATS1 device 571 and the ATS2 device 572 are activated, while the ATS3 device 573 is inactive. Although the first and second power zones are connected to the ATS1 device 571, the ATS1 device 571 is able to selectively send power to the first or second power zones 510 and 520. For example, while the first power zone 510 receives power from the power pool 550 via the ATS1 device 571 the second power zone 520 is receiving no power from the power pool 550. The first power zone 510 is receiving 4000 Watts from the power pool 550 via the ATS1 device 571.

The ATS2 device 572 is activated. The third power zone 530 receives power from the power pool 550 via the ATS2 device 572. The third power zone 530 is receiving 4000 Watts from the power pool 550 via the ATS2 device 572. The ATS3 device 573 is inactive. As a result, the fourth set of chasses 541 within the fourth power zone 540 is not receiving any power.

FIG. 6C exemplifies a third embodiment of the information handling system 500 configured to dynamically allocate power resources according to a server device's demands in real time. The ATS1 device 571, the ATS2 device 572 and the ATS3 device 573 are activated. Although the first and second power zones are connected to the ATS1 device 571, the ATS1 device 571 is able to selectively send power to the first or second power zones 510 and 520. For example, while the first power zone 510 receives 4000 Watts from the power pool 550 via the ATS1 device 571 the second power zone 520 is receiving 12000 Watts from the power pool 550.

Figure 7:
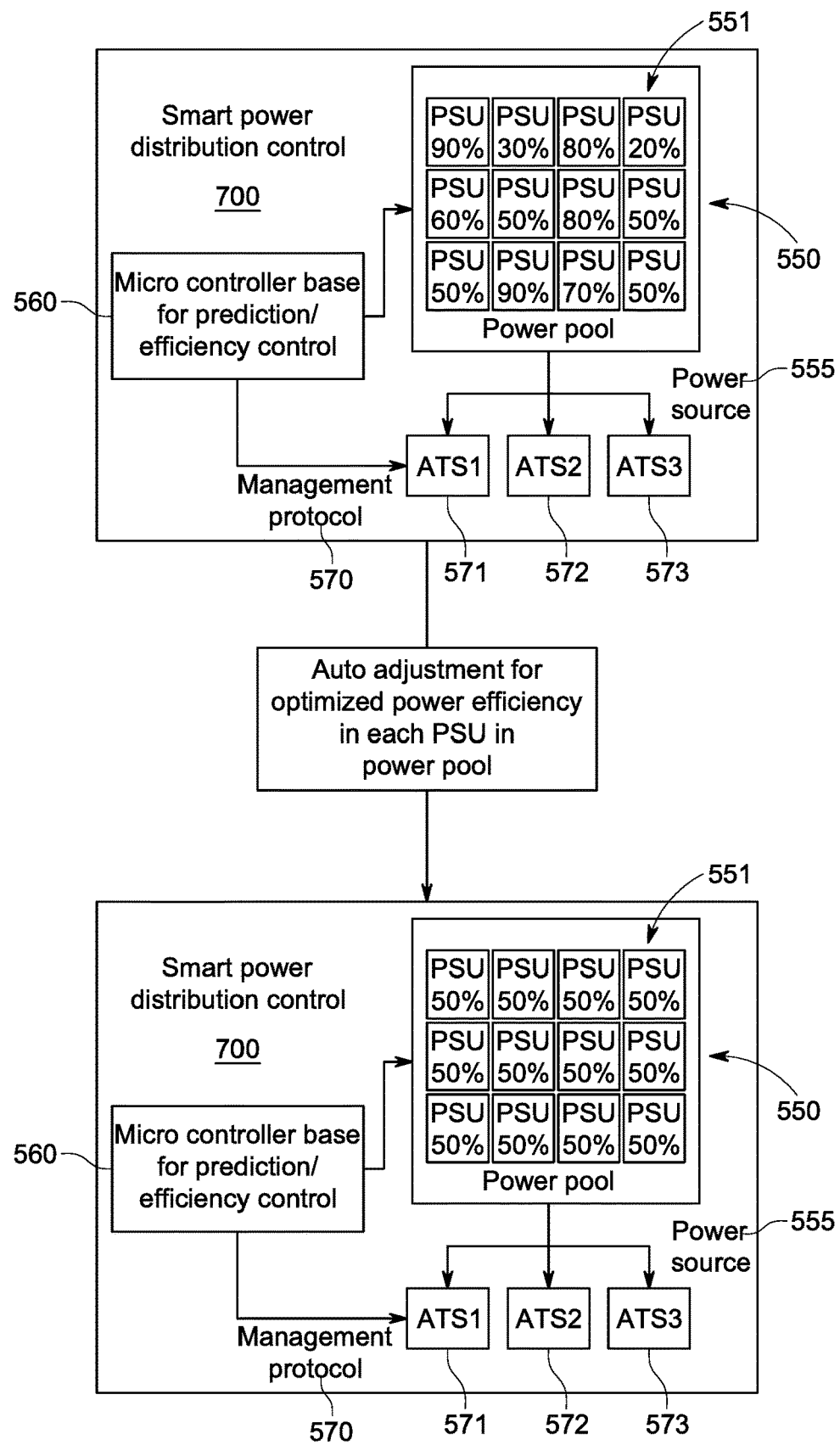
FIG. 7 illustrates a power distribution control system 700 configured to dynamically allocate power resources according to a server device's demands in real time.

The ATS2 device 572 and the ATS3 device 573 are also activated. The third power zone 530 receives power from the power pool 550 via the ATS2 device 572. The third power zone 530 is receiving 4000 Watts from the power pool 550 via the ATS2 device 572. The fourth power zone 540 receives power from the power pool 550 via the ATS3 device 573. The fourth power zone 540 is receiving 5000 Watts from the power pool 550 via the ATS3 device 573. The central controller 560 can optimize each of the power supply units (not shown) within the power pool 550. FIG. 7, below, provides an example of how the power pool 550 can be optimized for performance.

FIG. 7 illustrates a power distribution control system 700 configured to dynamically allocate power resources according to a server device's demands in real time. The power distribution control system 700 can include the central controller 560 and a power pool 550. The power pool 550 can be connected to a power source 555.

The power distribution control system 700 can also include a ATS1 device 571, a ATS2 device 572, and a ATS3 device 573. The first, second, and third ATS devices 571-573 can be controlled by the central controller 560. The central controller 560 can implement the ATS devices 571-573 to distribute power to a specific set of chasses. The central controller 560 can implement the ATS devices 571-573 by using a management protocol 570 installed on the central controller 560. The power pool 550 can include a plurality of power supply units 551. In some embodiments, the power supply units 551 can include varying power supply performance metrics. The power supply units 551 vary from 90% optimization to 20% optimization. The central controller 560 can optimize the power supply units 551 such that all of the power supply units 551 are optimize for maximizing performance. For the purposes of example, the power supply units 551 are equally optimized to 50% for maximizing performance. In some cases, the power supply units 551 can be equally optimized between 40-60%. In some embodiments, the central controller 560 can monitor the PSU status of all of the power supply units 551 to re-allocate the power distribution each power supply unit to ensure the power supply unit is optimized between 40% to 60%.

Figure 8:
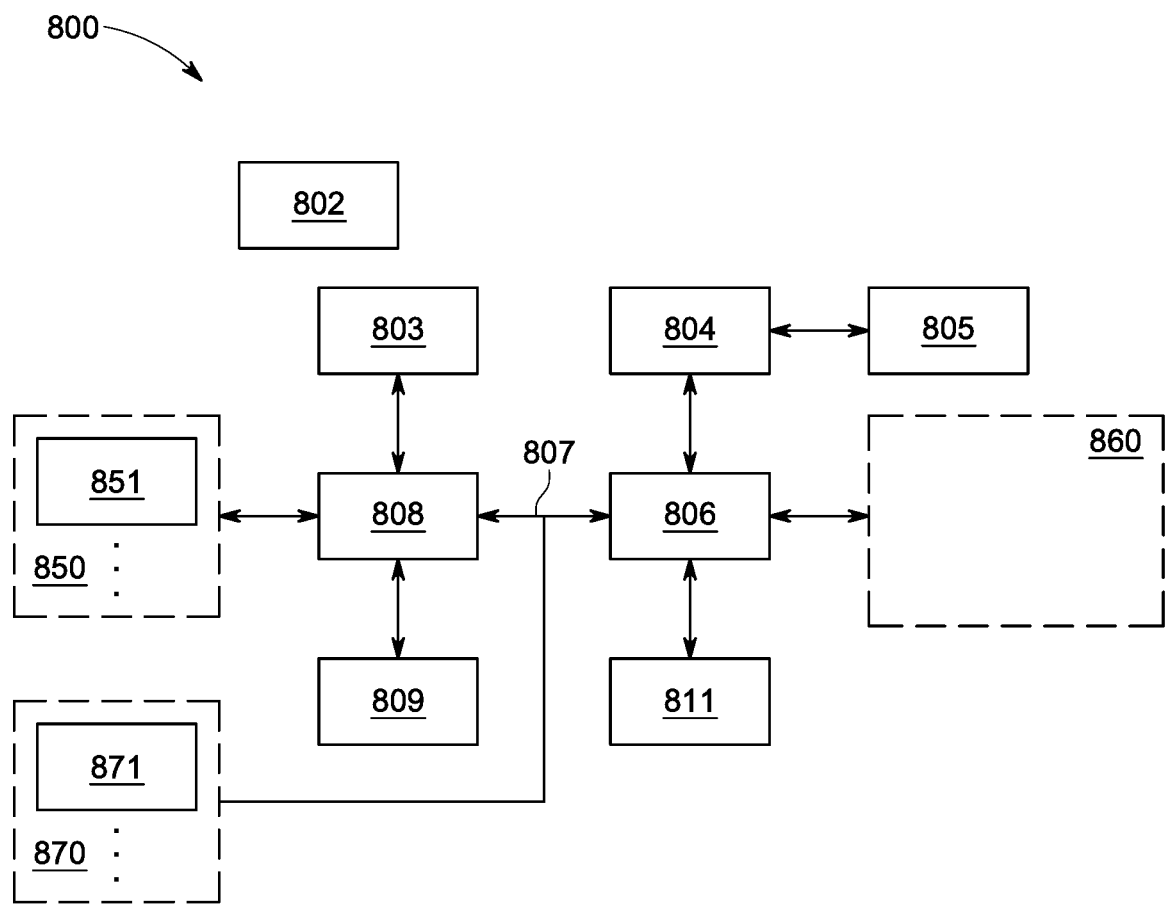
FIG. 8 is a schematic block diagram illustrating an exemplary system 800, in accordance with an implementation of the present disclosure.

FIG. 8 is a schematic block diagram illustrating an exemplary server system 800, in accordance with an implementation of the present disclosure. In this example, the server system 800 includes at least one microprocessor or processor 804; a BMC 803; one or more cooling modules 860; a main memory (MEM) 811; at least one power supply unit (PSU) 802 that receives an AC power from an AC power supply, and provides power to various components of the server system 800, such as the processor 804, north bridge (NB) logic 806, PCIe slots 860, south bridge (SB) logic 808, storage device 809, ISA slots 850, PCI slots 870, and BMC 803.

After being powered on, the server system 800 is configured to load software application from memory, a computer storage device, or an external storage device to perform various operations. The storage device 809 is structured into logical blocks that are available to an operating system and applications of the server system 800. The storage device 809 is configured to retain server data even when the server system 800 is powered off.

In FIG. 8, the main memory 811 is coupled to the processor 804 directly. The main memory 811 may include, but is not limited to, DRAM, double data rate DRAM (DDR DRAM), static RAM (SRAM), or other types of suitable memory. The main memory 811 can be configured to store firmware data of the server system 800. In some configurations, firmware data can be stored on the storage device 809.

In some implementations, the server system 800 can further comprise a flash storage device. The flash storage device can be a flash drive, a random access memory (RAM), a non-volatile random-access memory (NVRAM), or an electrically erasable programmable read-only memory (EEPROM). The flash storage device can be configured to store system configurations such as firmware data.

The processor 804 can be a central processing unit (CPU) configured to execute program instructions for specific functions. For example, during a booting process, the processor 804 can access firmware data stored in the BMC 803 or the flash storage device, and execute the BIOS 805 to initialize the server system 800. After the booting process, the processor 804 can execute an operating system in order to perform and manage specific tasks for the server system 800. In another embodiment, the BIOS 805 connects to the PCH instead of the processor 804.

In some configurations, the processor 804 can be multi-core processors, each of which is coupled together through a CPU bus connected to the NB logic 806. In some configurations, the NB logic 806 can be integrated into the processor 804. The NB logic 806 can also be connected to a plurality of peripheral component interconnect express (PCIe) slots 860 and an SB logic 808 (optional). The plurality of PCIe slots 860 can be used for connections and buses such as PCI Express x1, USB 2.0, SMBus, SIM card, future extension for another PCIe lane, 1.5 V and 3.3 V power, and wires to diagnostics LEDs on the server system 800's chassis.

In system 800, the NB logic 806 and the SB logic 808 are connected by a peripheral component interconnect (PCI) Bus 807. The PCI Bus 807 can support functions on the processor 804 but in a standardized format that is independent of any of the processor 804's native buses. The PCI Bus 807 can be further connected to a plurality of PCI slots 870 (e.g., a PCI slot 871). Devices connect to the PCI Bus 807 may appear to a bus controller (not shown) to be connected directly to a CPU bus, assigned addresses in the processor 804's address space, and synchronized to a single bus clock. PCI cards that can be used in the plurality of PCI slots 870 include, but are not limited to, network interface cards (NICs), sound cards, modems, TV tuner cards, disk controllers, video cards, small computer system interface (SCSI) adapters, and personal computer memory card international association (PCMCIA) cards.

The SB logic 808 can couple the PCI Bus 807 to a plurality of expansion cards or ISA slots 850 (e.g., an ISA slot 851) via an expansion bus. The expansion bus can be a bus used for communications between the SB logic 808 and peripheral devices, and may include, but is not limited to, an industry standard architecture (ISA) bus, PC/804 bus, low pin count bus, extended ISA (EISA) bus, universal serial bus (USB), integrated drive electronics (IDE) bus, or any other suitable bus that can be used for data communications for peripheral devices.

In this example, BIOS 805 can be any program instructions or firmware configured to initiate and identify various components of the server system 800. The BIOS is an important system component that is responsible for initializing and testing hardware components of a corresponding server system. The BIOS can provide an abstraction layer for the hardware components, thereby providing a consistent way for applications and operating systems to interact with a peripheral device such as a keyboard, a display, and other input/output devices.

In system 800, the SB logic 808 is further coupled to the BMC 803 that is connected to the PSU 802. In some implementations, the BMC 803 can also be a rack management controller (RMC). The BMC 803 is configured to monitor operation status of components of the server system 800, and control the server system 800 based upon the operation status of the components.

Although only certain components are shown within the exemplary systems 800 in FIG. 8, various types of electronic or computing components that are capable of processing or storing data, or receiving or transmitting signals, can also be included in the exemplary system 800. Further, the electronic or computing components in the exemplary system 800 can be configured to execute various types of application, and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the exemplary systems 800, a variety of networking and messaging protocols can be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, FIG. 8 is used for purposes of explanation. Therefore, a network system can be implemented with many variations, as appropriate, yet still provide a configuration of network platform in accordance with various examples of the present disclosure.

In exemplary configurations of FIG. 8, the exemplary system 800 can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various examples.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The terminology used herein is for the purpose of describing particular embodiments only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A method for dynamically allocating power resources in real-time, the method comprising:
retrieving a power usage measurement from a plurality of server devices within at least one of a first set of server devices and at least one of a second set of server devices;
determining in real time whether the plurality of server devices include at least one of a power gap and at least one of an unused power supply;
upon determining in real time whether the plurality of server devices include at least one of the power gap and at least one of the unused power supply, determining a power distribution strategy in real time based on the power gap and the unused power supply; and
upon determining the power distribution strategy in real time, directing power in real time to at least one of the plurality of server devices within the at least one of the first set of server devices and the at least one of the second set of server devices based on the determined power distribution strategy.

2. The method of claim 1, further comprising periodically monitoring power usage of the plurality of server devices.

3. The method of claim 1, wherein the power usage measurement of the plurality of server devices is retrieved by a Pooled System Management Engine (PSME) unit.

4. The method of claim 1, wherein at least one of the power gap and at least one of the unused power supply is present when the plurality of server devices are initially installed within one or more chassis devices.

5. The method of claim 1, wherein at least one of the power gap and at least one of the unused power supply is present when a redundancy mode is implemented for a current distribution of power.

6. A system for dynamically allocating power resources in an information handling system, the system comprising:
a central controller connected to a plurality of automatic transfer switches;
a plurality of power zones, wherein each of the plurality of power zones includes a plurality of server devices, wherein each of the plurality of automatic transfer switches are connected to at least one of the plurality of power zones; and
a power pool connected to a power source,
wherein the power pool is connected to the central controller, the central controller being configured to dynamically allocate the power of the power pool to the at least one of the plurality of power zones by causing the system to: (i) retrieve a power usage measurement from a plurality of server devices, (ii) determine in real time whether the plurality of server devices include at least one of a power gap and at least one of a unused power supply, (iii) determine in real time a power distribution strategy based on determining whether the plurality of server devices include at least one of determining the power distribution strategy in real time, direct power in real time to at least one of the plurality of server devices based on the determined power distribution strategy.

7. The system of claim 6, wherein the plurality of server devices include at least one of a storage chassis, a GPU chassis, a storage chassis, and an accelerator chassis.

8. The system of claim 6, wherein the central controller is connected to the plurality of server devices via a management bar to retrieve a power usage measurement of each of the server devices within the plurality of server devices.

9. The system of claim 6, wherein the power pool is connected to the plurality of automatic transfer switches, such that the central controller directs power to the each of the plurality of power zones.

10. The system of claim 6, further comprising a plurality of power bars configured to connect the power pool to the each of the plurality of power zones, via the plurality of automatic transfer switches.

11. A non-transitory machine-readable medium having stored thereon instructions for performing a method comprising machine executable code that when executed by at least one machine, causes the machine to:
- retrieve a power usage measurement from a plurality of server devices within at least one of a first set of server devices and at least one of a second set of server devices;
- determine in real time whether the plurality of server device include at least one of a power gap and at least one of unused power supply;
- upon determining in real time whether the plurality of server device include at least one of the power gap and at least one of the unused power supply, determine a power distribution strategy in real time based on the power gap and the unused power supply; and
- upon determining the power distribution strategy in real time, direct power in real time to at least one of the plurality of server devices within the at least one of the first set of server devices and the at least one of the second set of server devices based on the determined power distribution strategy.

12. The non-transitory machine-readable medium of claim 11, further comprising periodically monitoring power usage of the plurality of server devices.

13. The non-transitory machine-readable medium of claim 11, wherein the power usage measurement of the plurality of server devices is retrieved by a Pooled System Management Engine (PSME) unit.

14. The non-transitory machine-readable medium of claim 11, wherein at least one of the power gap and at least one of the unused power supply is present when the plurality of server devices are initially installed within one or more chassis devices.

15. The non-transitory machine-readable medium of claim 11, wherein at least one of the power gap and at least one of the unused power supply are present when a redundancy mode is implemented for a current distribution of power.

* * * * *